March 22, 1966     H. G. LIEN     3,241,593
BEAD EXPANDER

Filed June 14, 1963     4 Sheets-Sheet 1

INVENTOR.
HAROLD G. LIEN
BY Moore, White & Burd
ATTORNEYS

March 22, 1966  H. G. LIEN  3,241,593
BEAD EXPANDER

Filed June 14, 1963  4 Sheets-Sheet 2

INVENTOR.
HAROLD G. LIEN
BY Moore, White + Burd
ATTORNEYS

March 22, 1966 H. G. LIEN 3,241,593
BEAD EXPANDER
Filed June 14, 1963 4 Sheets-Sheet 3

INVENTOR.
HAROLD G. LIEN
BY Moore, White & Beed
ATTORNEYS

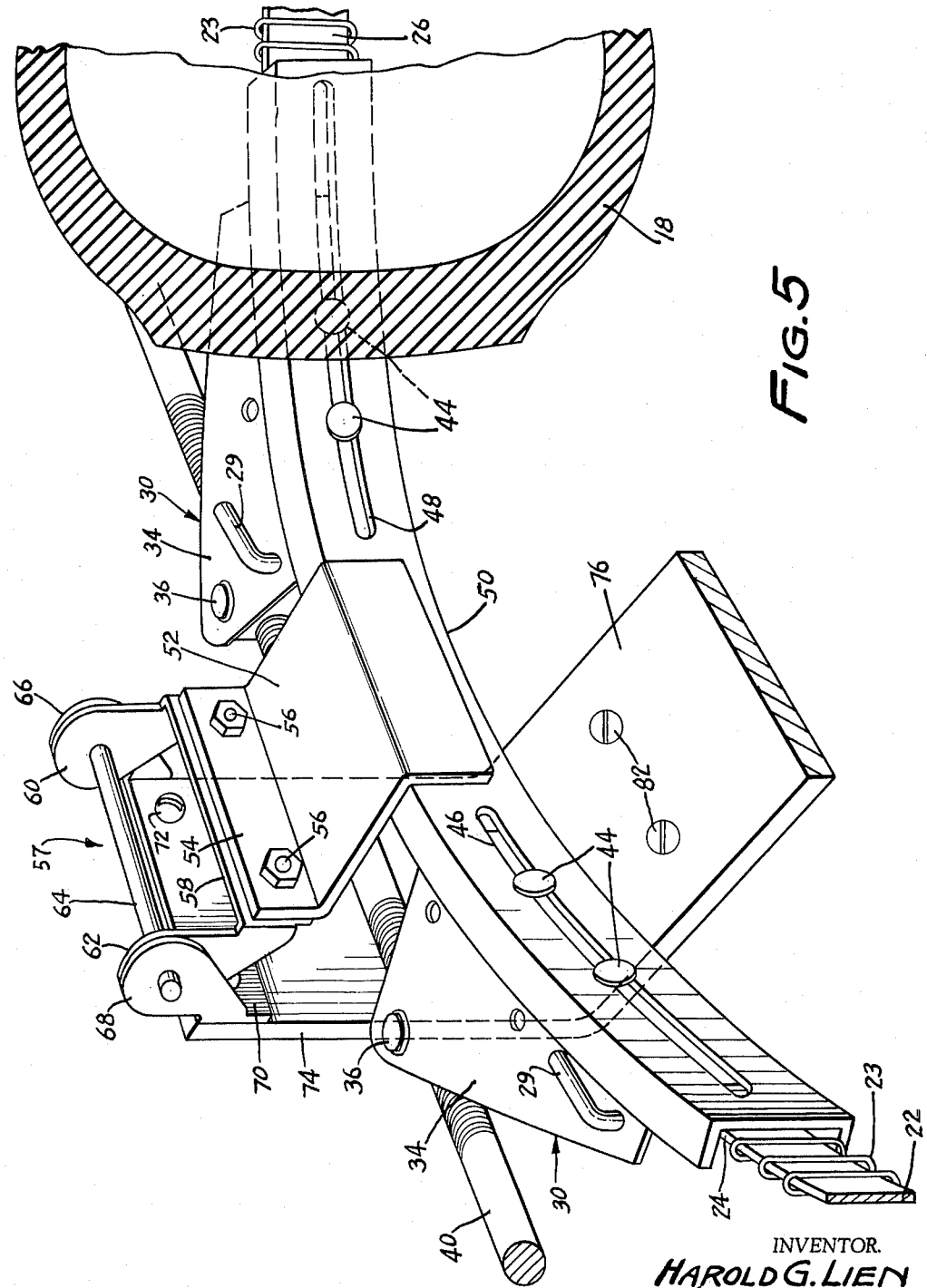

United States Patent Office 3,241,593
Patented Mar. 22, 1966

3,241,593
BEAD EXPANDER
Harold G. Lien, Osseo, Minn., assignor to Lien's Inc., Osseo, Minn., a corporation of Minnesota
Filed June 14, 1963, Ser. No. 287,965
2 Claims. (Cl. 157—1.21)

The present invention relates to tire repair equipment and more particularly to an improved bead expander of the type adapted for expanding the beads of a tubeless tire into engagement with the tire rim so as to facilitate the filling of the tire casing with air.

In the changing of tires by means of modern automatic and semi-automatic equipment, the tire is both removed and replaced on the rim after mounting the rim upon a so-called tire changing apparatus. When a tubeless tire is to be refilled, a means must be provided for urging the bead of the tire against the wheel rim so that the air can be trapped in the tire casing. A number of tire bead expanders have been previously proposed for this purpose. Such tire bead expanders frequently include a band and a contracting member for bringing the ends of the band together when the band is placed around the circumference of the tire. It is ordinarily stored on a wall shelf or the like and must be lifted into place and manually slipped over the tire before use. After the tire has been mounted upon the tire rim, such a bead expander must be removed and carried back to its storage location. Prior bead expanders of this type subject the user to a number of inconveniences which increase the amount of time required for changing a tire not only because the unit requires substantial time to mount and must be carried manually from one location to another but also because it can easily become misplaced or lost.

A problem inherent in the mounting of such bead expanders results from the fact that for proper operation the bead expander must be placed in the approximate center of the tire tread before it is contracted. As a result, in tires of various sizes, for example, those ranging in size from the smallest of the tires used on compact automobiles to the largest truck tires, the bead expander must be positioned at a greater distance axially from the side edge of the tire as the tire diameter increases. Previously, it was necessary to make such adjustment manually.

In view of these and other defects in the prior art it is one object of the present invention to provide an improved tire bead expander which will be available for use at all times and cannot become misplaced.

A further object of the present invention is the provision of a bead expander and tire changer including an improved connecting means for supporting the bead expander upon the tire changer.

It is still another object of the present invention to provide an improved bead expander having a provision thereon for mounting the same upon the upper end of the tire changer and wherein the bead expander can be quickly and easily moved out of the way so as not to interfere with the normal operation of the tire changer.

A further object of the present invention is the provision of an improved bead expander including a provision for automatically moving the expander axially of the tire as it is moved radially from the center of the tire whereby the tire engaging portion of the bead expander will be positioned at the center of the tire tread as the diameter of the bead expander is adjusted to fit tires of different diameters.

A further object of the present invention is the provision of a rugged, low cost bead expander which is maintained in position for ready use upon a tire changer but yet will not interfere with the operation of the tire changer when it is not in use.

Briefly stated, in accordance with a preferred form of the invention there is provided a tire changer adapted for supporting a wheel and tire with the rim positioned such that its axis is disposed vertically and a bead expander mounted thereon for movement between an operative and inoperative or retracted position thereon. Specifically, a bracket is provided to extend laterally from the tire changer and the bead expander is movably mounted upon the outward end of this bracket preferably for rotation about a horizontal axis, the expander being positionable in a horizontal plane when it is to be used and in a vertical plane extending downwardly from the bracket when inoperative.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 5 is a partial perspective view of a portion of the bead expander according to the present invention.

Figure 1:
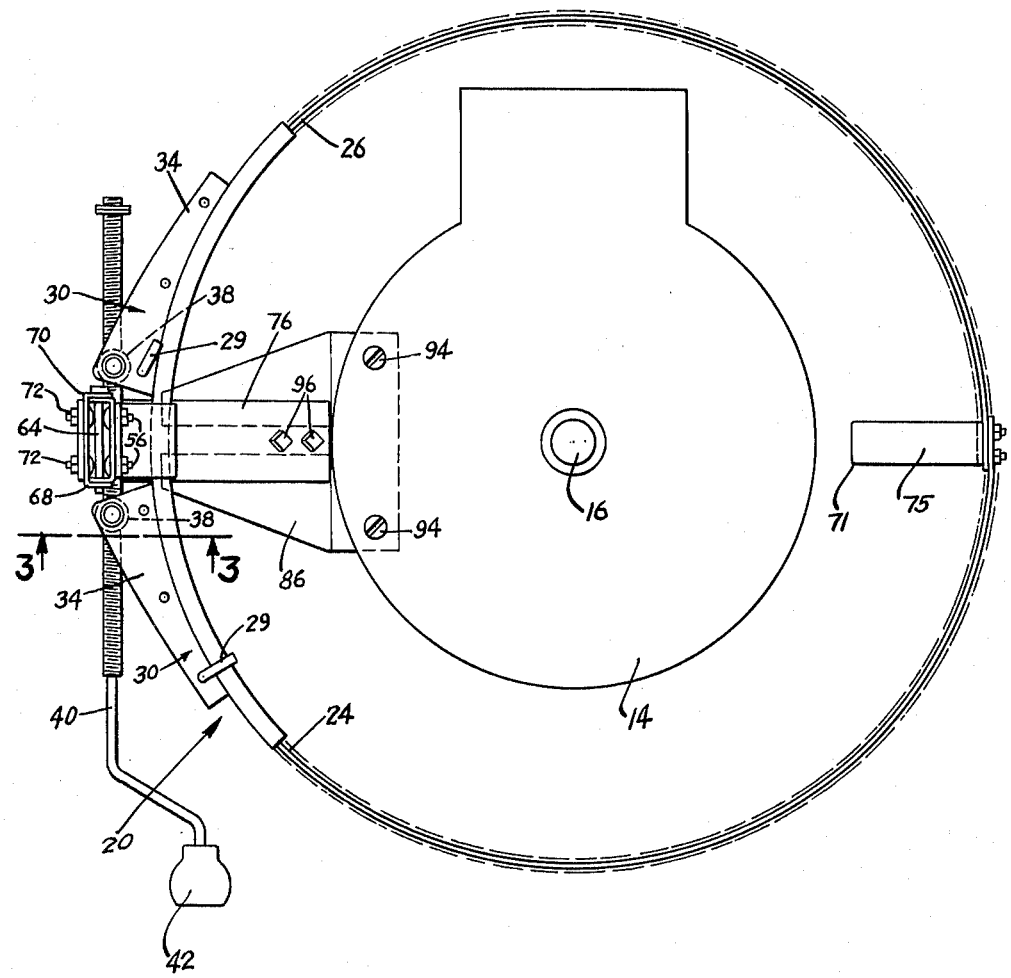
FIGURE 1 is a plan view of a tire changer and bead expander embodying the present invention.

Referring now to the figures there is shown a tire changer 10 of any suitable and well-known type including a vertically disposed base 12 composed of sheet metal or the like adapted to rest at its lower end upon the floor. Since the tire changer 10 is itself well-known, no detailed description thereof will be presented herein. At the upper end of the changer 10 is provided a horizontally disposed and generally circular top plate 14 to the center of which is affixed a vertically disposed post or center shaft 16 over which a tire 18 is positioned when the apparatus is to be used.

Figure 2:
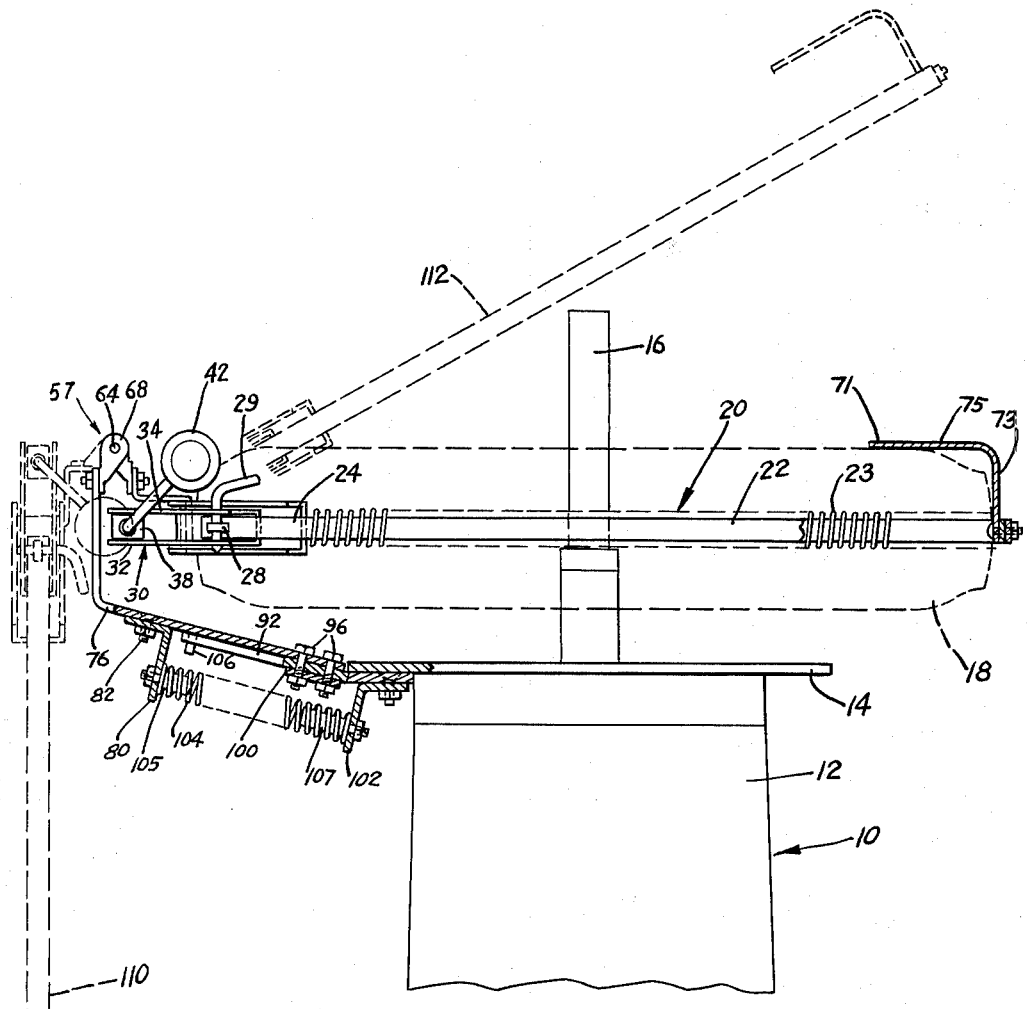
FIGURE 2 is a partial side elevational view of the tire changer and bead expander according to the present invention.

As can be clearly seen in FIGURES 2 and 5, the tire 18 will be positioned in a horizontal plane when mounted upon the apparatus with the center thereof concentric with the center of the shaft 16. Suitable stop means (not shown) is provided for limiting the downward movement of the rim of the tire 18. After the tire 18 has been placed in position, a locking and centering device (not shown) is employed to secure the tire rim 18 in position upon the frame 12.

With the tire 18 thus mounted upon the shaft 16, conventional bead breaking tools and the like (not shown) are employed for removing the tire casing from the rim thereof. Since a variety of such bead breaking tools and the like are well-known, they will not be described herein.

After the casing of the tire 18 has been removed from the rim, it is ordinarily taken to an adjacent work area where it can be examined for punctures and repaired.

Once the tire 18 has thus been repaired, it is returned to the tire changer and remounted upon the rim. It must then be refilled with air but since the tire bead of a tubeless tire does not fit snugly against the tire rim when unfilled, a means must be provided for urging the bead against the rim so that the first air admitted will fill the tire.

To this end I provide a bead expander indicated generally at 20 and including an elongated metal band 22 formed into a circle such that the ends designated 24 and 26 approach one another upon one side of the tire 18. The band 22 of the bead expander 20 is positioned during use in a horizontal plane as shown in FIGURE 1 and in solid lines in FIGURE 2.

Adjacent the ends 24 and 26 of the band 22 are provided identical eyes 28 (only one of which is shown). Through each eye 28 extends a vertically disposed pin 29 for securing a slide connector 30 to each of ends 24 and 26 of the band 22. Mounted over the band 22 is an elongated spring 23 which grips the tire tread and will slide freely thereon so that the band 22 will move easily relative to the tire 18 when tightened.

The slide connectors 30 each include parallel and horizontally spaced side plates 32 and 34 between which extend vertically disposed pins 36. The pins 36 include enlarged center portions 38 (FIGURES 1, 2 and 3) having horizontally disposed threaded openings therein. The threads in each of these openings are in the opposite sense, that is to say, one is left handed and the other right handed. Within the openings in the pins 38 there is threaded an elongated horizontally disposed contracting means such as a crank 40 having an offset handle 42. It should be apparent that when the handle 42 is turned in one direction, the threads extending through the pins 36 will draw the slide connectors 30 toward one another to a contracted position. When the handle 42 is turned in the opposite direction, the pins 36 and slide connectors 30 will move away from each other to an expanded position.

Extendingly centrally from each slide connector 30 is a pair of horizontally disposed fasteners such as rivets 44 which extend through and are slidably mounted within horizontallly disposed guide openings 46 and 48 in an arcuate slide channel 50. It should thus be clear that when the slide connectors 30 move toward each other, the rivets 44 will slide toward the adjacent ends of the slots 46 and 48 and when separated, the rivets will slide toward the opposite ends of the slots, the rivet heads being adapted to retain slide connectors 30 adjacent the slide channel 50 throughout operation.

Extending radially from the upward edge of the slide channel 50 and suitably secured thereto as by welding is a support member formed from a metal plate 52. The plate 52 includes an upwardly extending tab 54 which is affixed as by bolts 56 to a hinge indicated generally at 57 and including a generally U-shaped hinge member 58 having a pair of parallel and upwardly extending arms 60 and 62 respectively through which extends a horizontally disposed pivot pin 64. Secured to the ends of the pin 64 immediately outwardly of the arms 60 and 62 are a pair of parallel arms 66 and 68 respectively, of a hinge member 70. Rigidly secured to a portion of the band 22 opposite the hinge 57 is a support arm 71 which includes a vertically extending portion 73 and a horizontally and inwardly extending portion 75 for purposes hereinafter explained.

Figure 4:
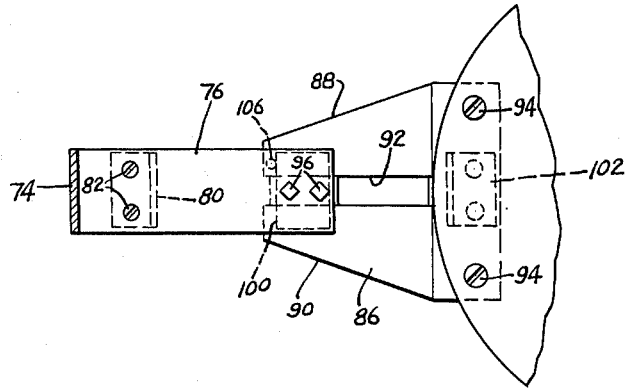
FIGURE 4 is a horizontal sectional view taken on line 4—4 of FIGURE 3.

Suitably secured to the hinge member 70 as by bolts 72 is a vertically disposed and downwardly extending bracket arm 74 formed from sheet metal or the like, including a downwardly inclined portion 76 proceeding toward the center of the tire changing apparatus 10. As can best be seen in FIGURE 4, the downwardly inclined portion 76 of the bracket arm 74 includes a downwardly extending support 80 secured thereto as by bolts 82, for purposes hereinafter described.

The lower and inward end of the bracket arm 74 is slidably secured at 84 to a slide plate 86 which includes a pair of spaced slide members 88 and 90 separated by a central slot 92 extending radially with respect to the tire changer 10. The slide plate 86 itself is rigidly secured to the top plate 14 in any suitable way as by bolts 94 and is inclined upwardly proceeding toward the outward end thereof.

The portion 76 of arm 74 is slidably connected to plate 86 by a pair of bolts 96 which extend downwardly from the lower end of the arm 84 through slot 92 and are fastened at their lower ends to a plate 100 positioned in abutting relationship with the lower surface of each of the members 88 and 90. The tension of bolts 96 is preferably adjusted so that the plate 100 will exert a slight pressure against the lower surface of both the plates 88 and 90 but will still permit relatively free sliding movement therebetween. The assembly comprising the lower portion of the slide arm 74, the bolts 96 and the plate 100 can be thought of as a means for frictionally retaining the support arm 74 upon the slide plate 86.

Figure 3:
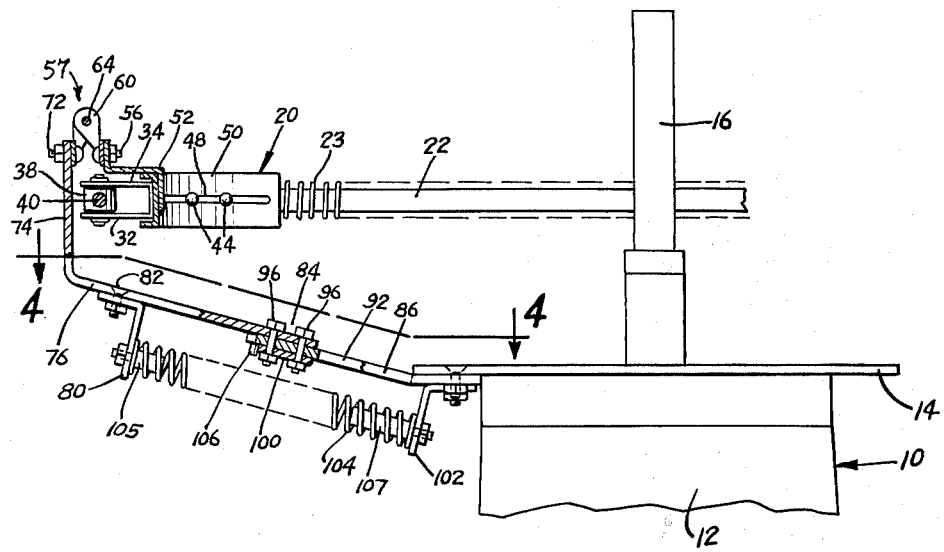
FIGURE 3 is an enlarged transverse sectional view taken on line 3—3 of FIGURE 1 with the bead expander support parts moved radially outward.

Extending inwardly from the lower end of the support 80 and secured to a bracket 102 at its inward end is a compression spring 104 for yieldably biasing the bead expander 20 and slide arm 74 radially outward and upward relative to the shaft 16. As best shown in FIGURES 2 and 3, a post 105 extends inwardly from the lower end of the bracket 80 within the center of the spring 104. A similar post 107 extends outwardly within the spring 104 from the bracket 102. The posts 105 and 107 cooperate to prevent lateral deflection of the compression spring 104. When the arm 74 is to be slid outwardly relative to the slide plate 86 the spring 104 will provide assistance, the frictional retention of the bolt 96 and the plate 100, however, being sufficient to prevent undesired outward movement of the arm 74 on the plate 86.

It should be readily apparent that since the portions 88 and 90 of the slide plate 86 and the lower portion of the slide follower 76 are inclined upwardly proceeding outward toward the hinged connection, the bead expander 22 will slide axially upward with respect to the shaft 16 as it is moved outwardly. This provision of the invention greatly facilitates centering the band 22 between the side edges of the tire tread in tires of different sizes. Thus, as the hinge 57 is slide radially outward to accommode tires of larger diameter, the hinge 57 will be automatically elevated a predetermined distance.

Extending downwardly from the lower edge of the portion 88 of slide plate 86 is a stop pin 106 which will abut against one edge of the plate 100 when the plate 100 is moved to the end of the slide plate 86 thereby preventing its accidental removal.

When the bead expander apparatus according to the present invention is out of use, it is preferably maintained in a vertical downwardly depending position shown in dotted lines at 110 in FIGURE 2. In this position, it will be spaced laterally of the base 12 of the tire changer 10 and will remain quickly accessible but out of the way while the tire 18 is mounted upon the center post 16. When the tire 18 has been repaired and is to be again filled with air, the bead expander 20 is swung upwardly in a clockwise direction about pin 64 as seen in FIGURE 2, from the dotted line position 110 to the dotted line position 112 and thence to the solid line position of FIGURE 2.

When this has been done, the slide follower 74 is pushed inwardly and downwardly in the event that the tire 18 is relatively small in size or is pulled outwardly and upwardly in the event that the tire 18 is relatively large in order to position the center of band 22 approximately coaxial with the shaft 16. When the free end of band 22 has been lowered to the approximate center of the tire 18, the support arm 71 will engage the upper side wall of tire 18 and prevent further downward pivotal movement of the bead expander about pin 64.

The crank 42 is then turned to draw the slide connectors 30 toward each other thereby contracting the band 22 within the spring 23 until the center of the tread of the tire is forced axially a sufficient distance to urge the beads thereof into tight contact with the tire rim. After this operation has been performed, the air is forced into the tire casing until the beads are supported pneumatically against the tire rim. The handle 42 is then turned so as to loosen the band 22. The entire bead expander 20 can then be pivoted about pin 64 to the inoperative position 110.

The present invention provides a bead expander which is rugged in construction and reliable in operation. It will have no opportunity to become misplaced or lost and is always in a position ready for use. At the same time, it is kept out of the way while other operations are being performed on the tire. Moreover, as the expander supporting parts are moved radially of the tire support means, the expander will be moved axially thereof automatically, thus making it unnecessary to center the band of the bead expander on the tire tread each time a different size tire is repaired.

While the angle of inclination may vary, I have found that if the portion 76 is inclined at an angle of 22½° with respect to the horizontal, operation will be satisfactory for most tires presently in use.

It is apparent that many modifications and variations of this invention as hereinbefore set forth may be made without departing from the spirit and scope thereof. The specific embodiments described are given by way of example only and the invention is limited only by the terms of the appended claims.

I claim:
1. The bead expander for a tire changer comprising in combination, a base member, slide means extending outwardly therefrom and having an upwardly inclined portion proceeding peripherally, a bead expander mounted thereon for sliding movement upon said inclined portion, said bead expander being thereby moved vertically when said expander is moved radially of said base member; whereby said bead expander will become centered between the side edges of the tread of a tire on said tire changer.

2. The apparatus according to claim 1 wherein a resilient means is connected between the expander and the slide means for yieldably biasing the expander outwardly upon said slide means.

References Cited by the Examiner
UNITED STATES PATENTS

| | | | |
|---|---|---|---|
| 2,413,010 | 12/1946 | Teegarden. | |
| 2,791,270 | 5/1957 | Hildebrandt | 157—1.21 |
| 2,888,064 | 5/1959 | Coxworth | 157—1.24 |
| 2,886,099 | 5/1959 | Bishman | 157—1.21 |

GRANVILLE Y. CUSTER, JR., *Primary Examiner.*